United States Patent Office 3,618,459
Patented Nov. 9, 1971

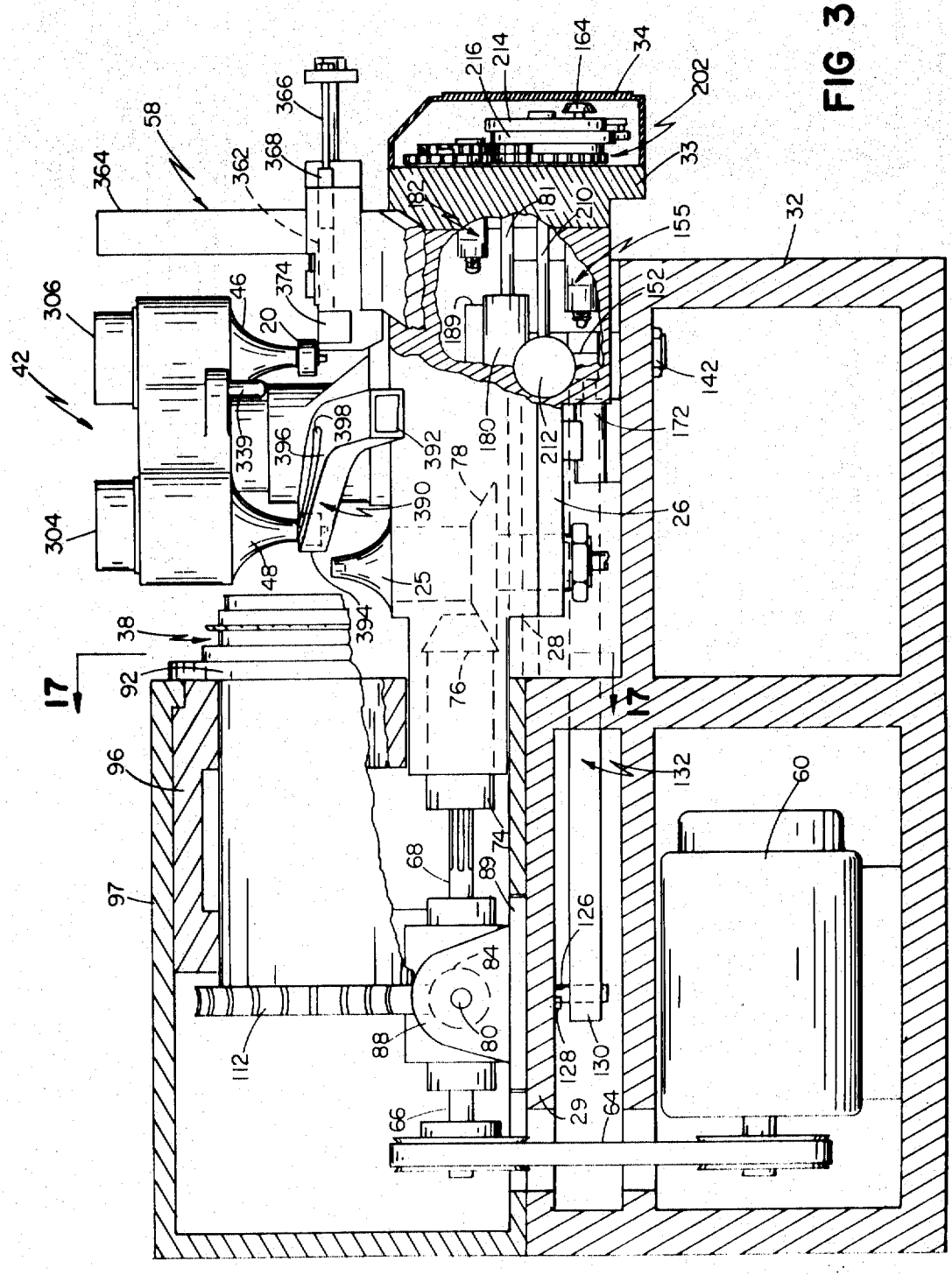

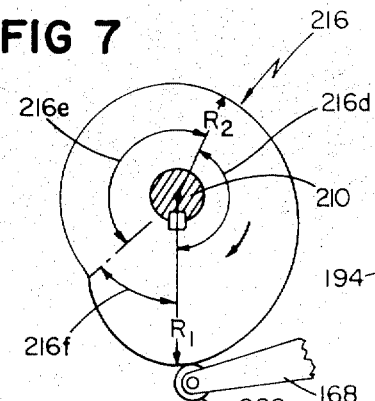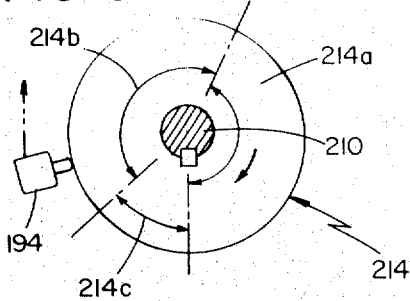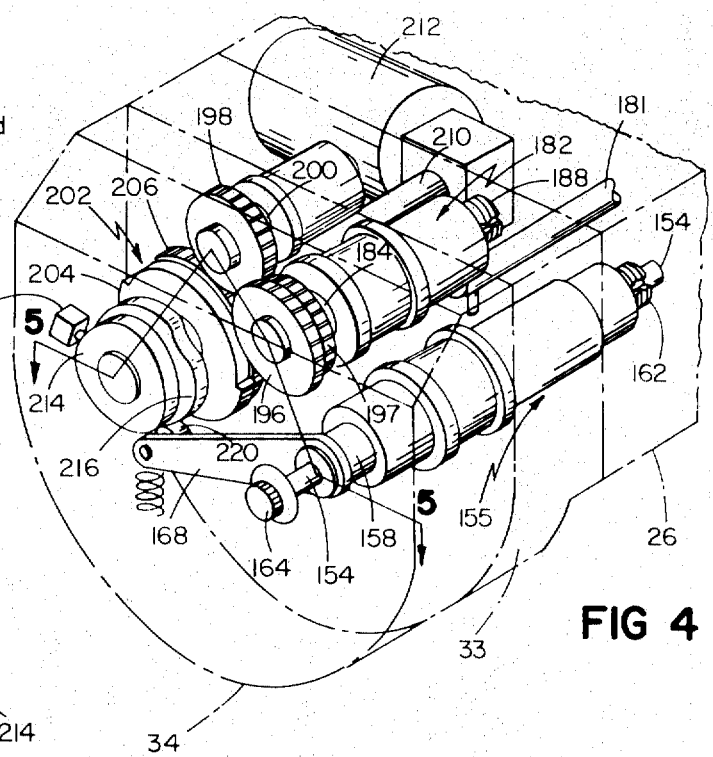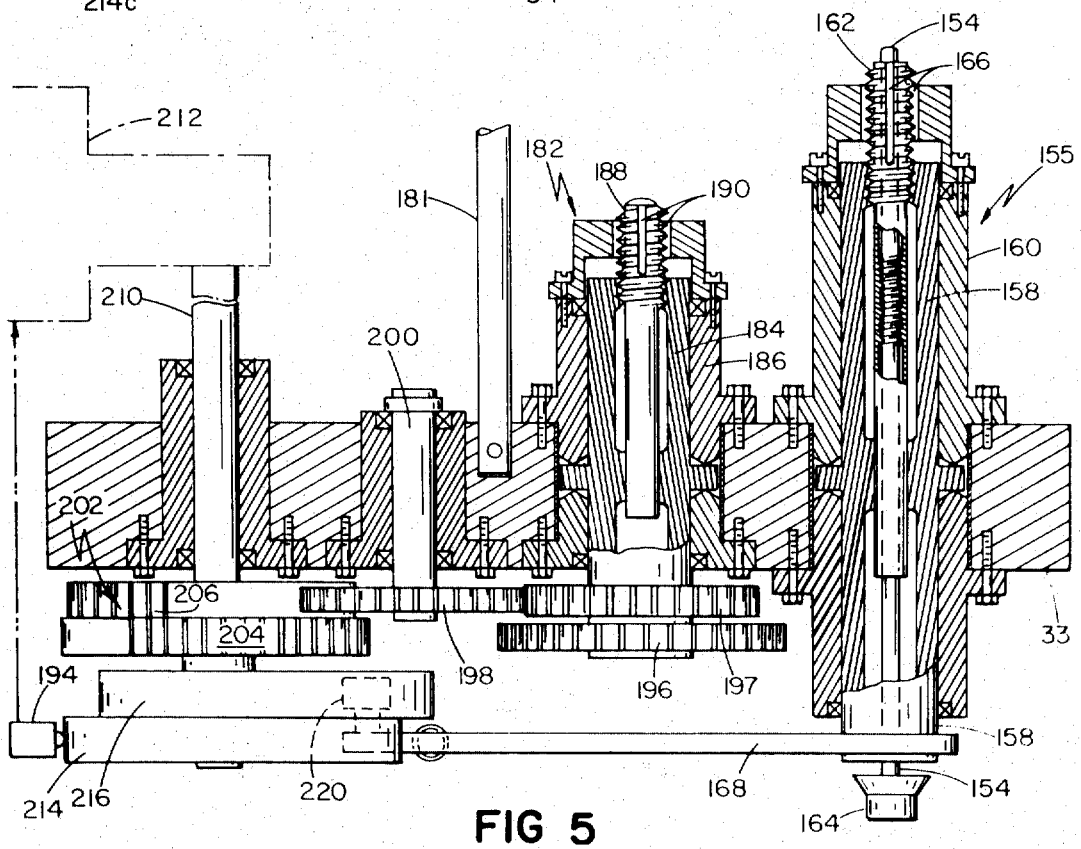

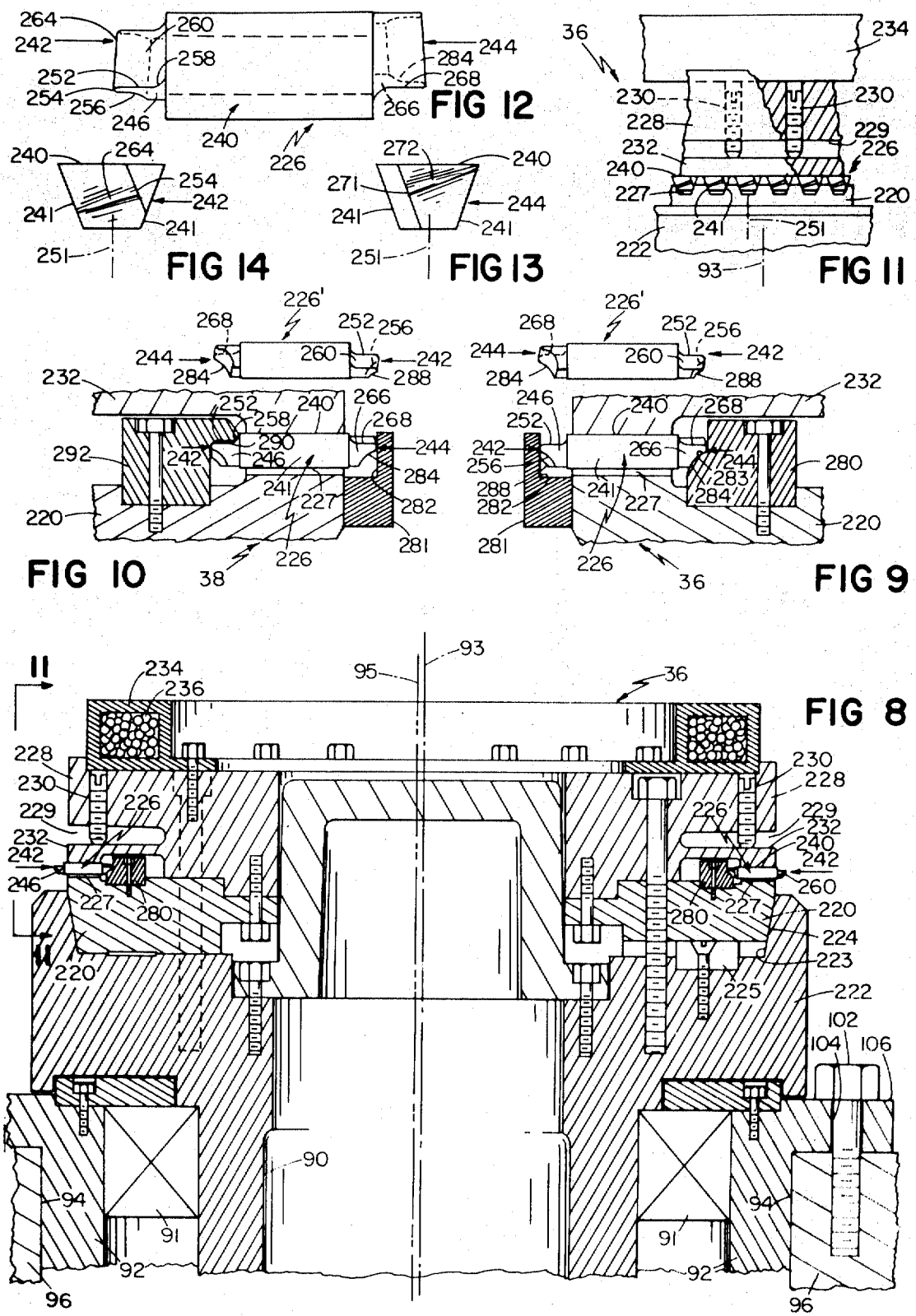

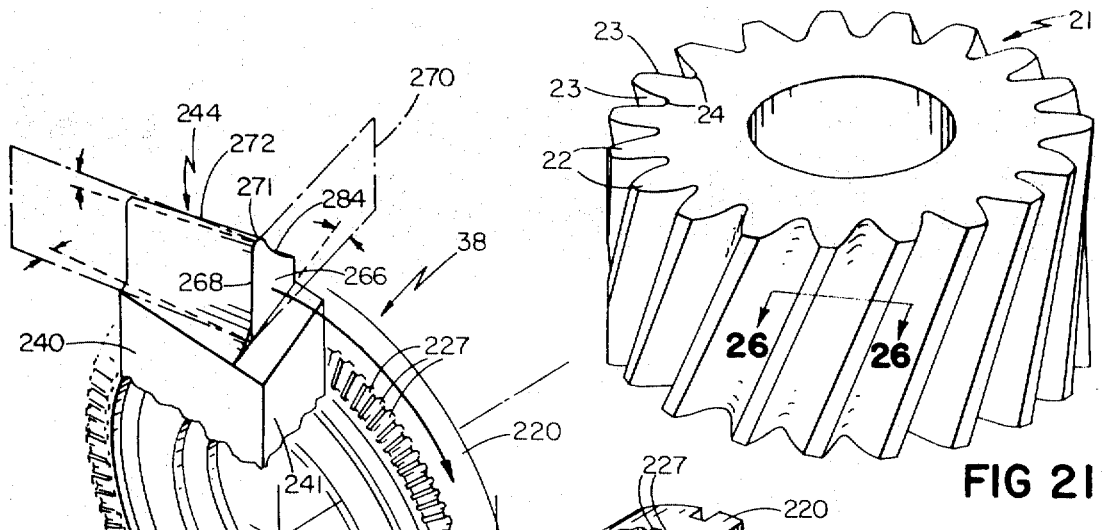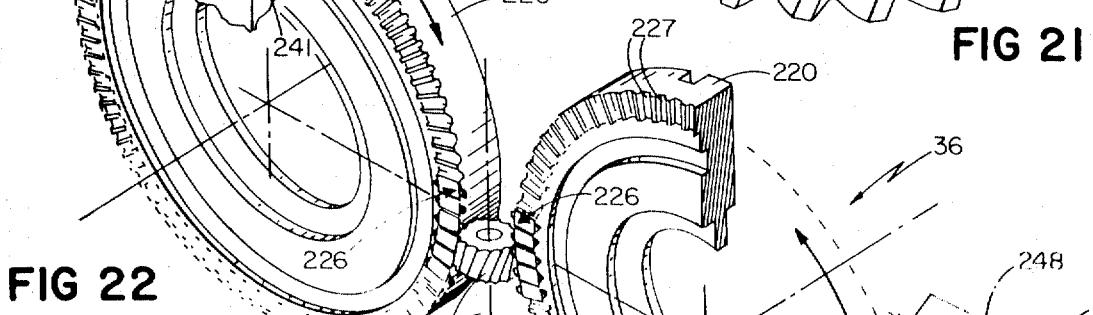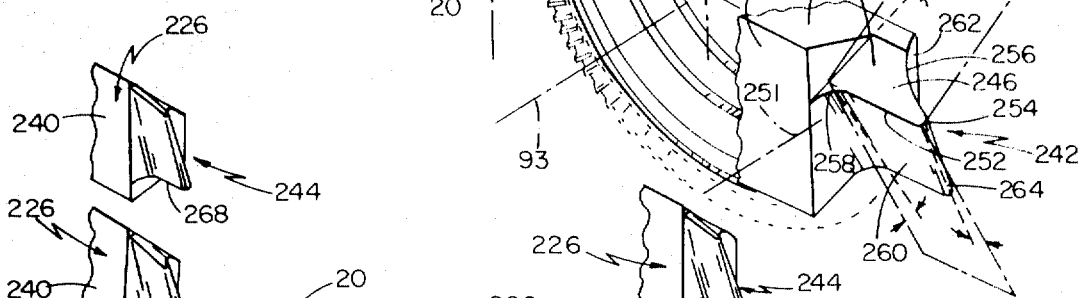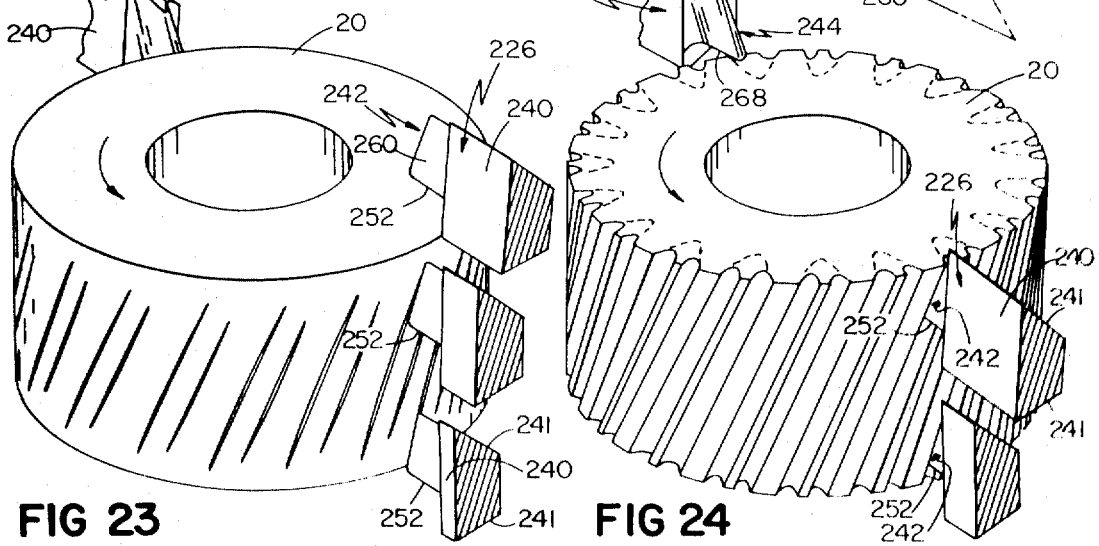

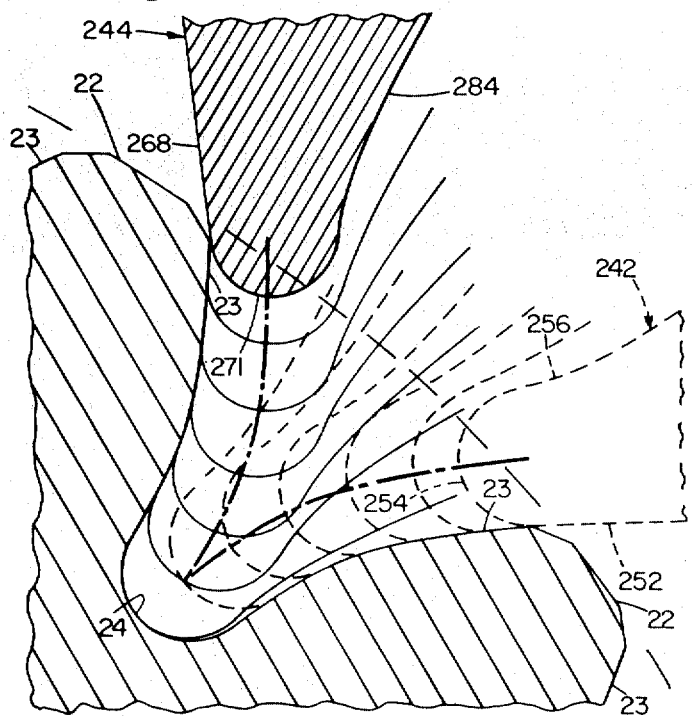
FIG 26
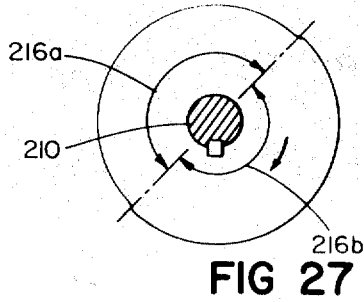
FIG 27
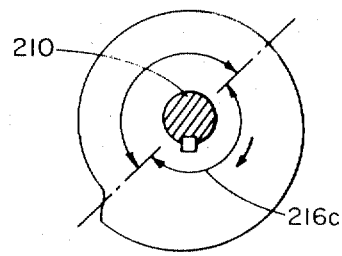
FIG 28
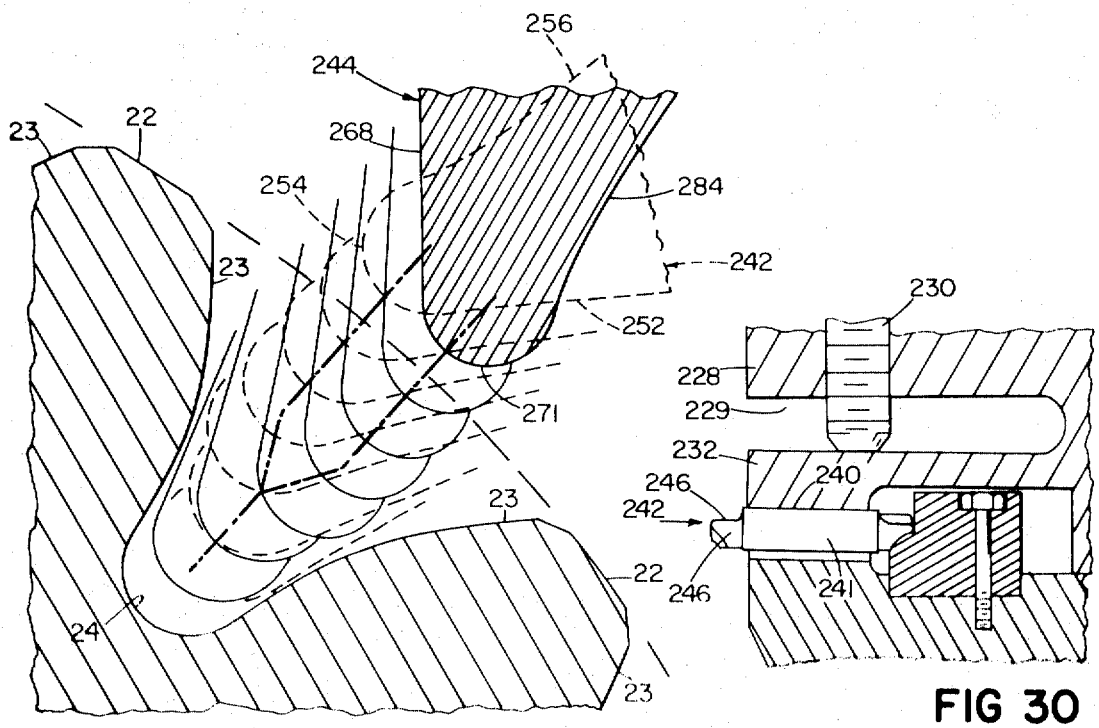
FIG 29
FIG 30

3,618,459
GEAR MAKING
Alexander D. F. Moncrieff, Marion, Mass., assignor to Bird Island, Inc., Boston, Mass.
Filed Aug. 8, 1969, Ser. No. 848,599
Int. Cl. B23f 23/04
U.S. Cl. 90—1    10 Claims

ABSTRACT OF THE DISCLOSURE

Loading and unloading workpieces in gear making apparatus having workpiece support adjacent a cutter, with a pair of workpiece holders mounted on a carrier for oscillation with respect to the support and further with respect to a workpiece supply station, the carrier intermittently undergoing rotation about and movement along its own axis.

---

This invention relates to making gears.

Objects of the invention are to provide for rapid and reliable loading of workpieces in a gear making machine, with apparatus that is simple, inexpensive, and easily operated.

The invention features a pair of workpiece holders mounted on a carrier for oscillation with respect to a workpiece support adjacent a gear cutter and further with respect to a workpiece supply station; the carrier intermittently undergoing rotation about and movement along its own axis. In preferred embodiments the oscillation includes translation with respect to the supply station, simultaneously with the rotation; each holder alternately carries a workpiece from the supply station to the support, and withdraws a gear from the support; each workpiece is held tightly between the support and one of the holders during a gear cutting cycle; each holder includes an expansive arbor driven by a motor to match the speed of the support prior to deposit of the workpiece on the support, and braked to a stop prior to subsequent insertion of the arbor into a workpiece at the supply station; the carrier is cylinder operated for its axial movement, and is rotated in 180° increments by a rack and pinion that mesh only when the carrier is raised so that the holders are free of the supply station and the support, respectively; a pickoff provides a cam surface to wipe the gear from its arbor upon rotation of the carrier; and the supply station includes a stationary trough supplied by a stacking tube, a pusher operating to move individual workpieces from the bottom of the tube to a spring biased positioning block.

Other objects, features, and advantages will appear from the following description of a preferred embodiment of the invention, taken together with the attached drawings thereof, in which:

FIG. 3 is a semi-schematic view, partially broken away, taken along 3—3 of FIG. 2, showing the work slide partially retracted;

FIG. 4 is an isometric view showing the interior of the work slide and work slide apron, the slide and apron being shown in phantom;

FIG. 5 is a sectional view taken along 5—5 of FIG. 4;

FIG. 6 is an elevation showing the feed control cam;

FIG. 7 is an elevation showing the phase control cam;

FIG. 8 is a sectional view of one cutter, taken along 8—8 of FIG. 17;

FIG. 9 is an enlarged fragment of FIG. 8, shown with the addition of a tool positioning ring, a tool being shown separately at the top in the incorrect endwise orientation;

FIG. 10 is a view similar to FIG. 9, but showing a portion of the other cutter;

FIG. 11 is an enlarged fragment taken along 11—11 of FIG. 8;

FIG. 12 is a plan view of a tool;

FIG. 13 is an end view from the right of FIG. 12;

FIG. 14 is an end view from the left of FIG. 12;

FIG. 21 is an isometric view of the gear to be made;

FIG. 22 is a semi-schematic view showing portions of the two cutters and a workpiece, most of the tools being omitted, and one tool fragment in each cutter being shown in enlarged scale;

FIG. 23 is a semi-schematic view showing the relationship of selected tools of both cutters to the workpiece at a time when only shallow cuts have been made;

FIG. 24 is a view similar to FIG. 23 taken when the cuts are deeper, the tooth profiles to the generated being shown in phantom;

FIG. 26 is a semi-schematic view taken along 26—26 of FIG. 21 and additionally showing a sequence of selected tool positions of the cutting tools relative to the gear ultimately produced, the tools of one cutter being shown in dashed lines, the loci of positions of a single point on the tools of each cutter being shown in heavy dashed lines;

FIG. 27 is an elevation of an alternative phase control cam;

FIG. 28 is an elevation of another alternative phase control cam;

FIG. 29 is a view similar to FIG. 26, but showing selected tool positions during a roughing infeed cycle; and FIG. 30 is an enlarged view similar to FIG. 9, partially sectioned, of a fragment of a cutter illustrating another embodiment of the invention.

Figures 1, 25:
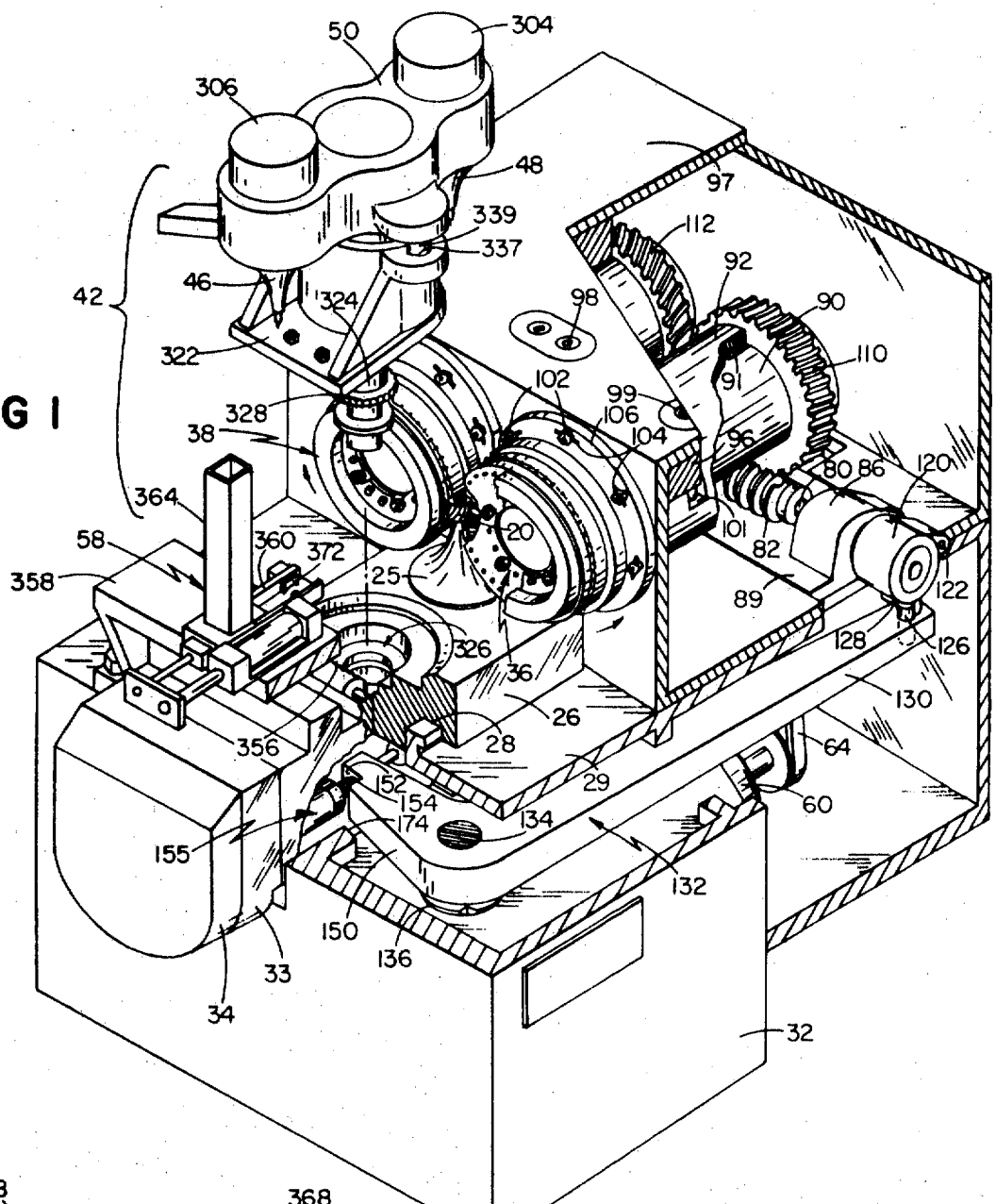
FIG. 1 is anisometric view, partially broken away and exploded, of the overall machine.
FIG. 25 is a plan view partially broken away of the supply station of the automatic loading apparatus.

The particular apparatus to be described will make from gear blank 20 (FIG. 1) a gear 21 (FIG. 21) having teeth 22 with tooth profiles 23 and fillets 24. Terminology used herein is consistent with that of American Gear Manufacturers Association Standard Number 112.04 (August 1965).

Referring to FIG. 1, work spindle 25 (of carbide, for stiffness) carrying as a workpiece gear blank 20, is mounted for rotation on slide 26 in turn mounted for linear movement on ways 28 of platform 29 supported on machine base 32. Apron 33, with removable cover 34, is secured to slide 26 and overhangs the front of the machine. Cutters 36 and 38 are respectively mounted for rotation in opposite directions (from the point of view in FIG. 1, as indicated by the arrows) about parallel axes perpendicular to, and spaced at equal center distances from, the axis of rotation of work spindle 25. Automatic gear blank loading assembly 42 (shown in part exploded out of its actual position) is mounted on slide 26 and includes a pair of carbide work spindle adapters 46 and 48 carried on spider 50, and a gear blank supply station 58.

Figure 2:
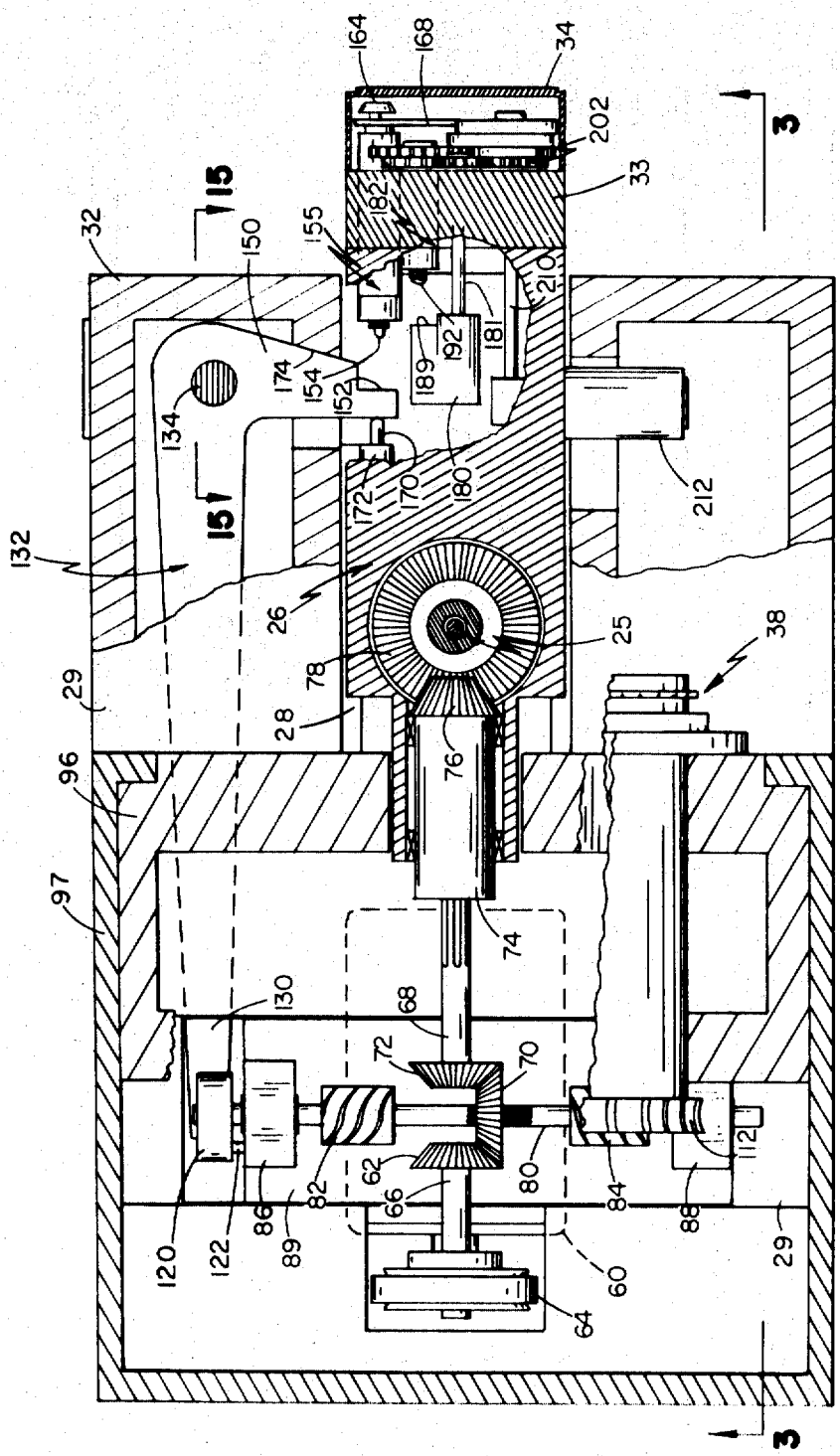
FIG. 2 is a semi-schematic plan view partially broken away showing the work slide fully retracted.

As best shown in FIGS. 2 and 3, motive power for rotating the work spindle and the cutters is supplied by motor 60, which drives bevel gear 62 (FIG. 2) through belt 64 and shaft 66. Gear 62 in turn drives shaft 68 through bevel gears 70 and 72. Shaft 68 is splined to sleeve 74 mounted for rotation (but axially fixed) in slide 26. Sleeve 74 carries bevel gear 76 which drives bevel gear 78 to rotate spindle 25.

Gear 70 is splined to shaft 80, which carries opposite handed worms 82 and 84 and is supported for rotary and axial movement in combination rotary-linear bearings 86 and 88 mounted on plate 89 in turn bolted to platform 29.

Figure 17:
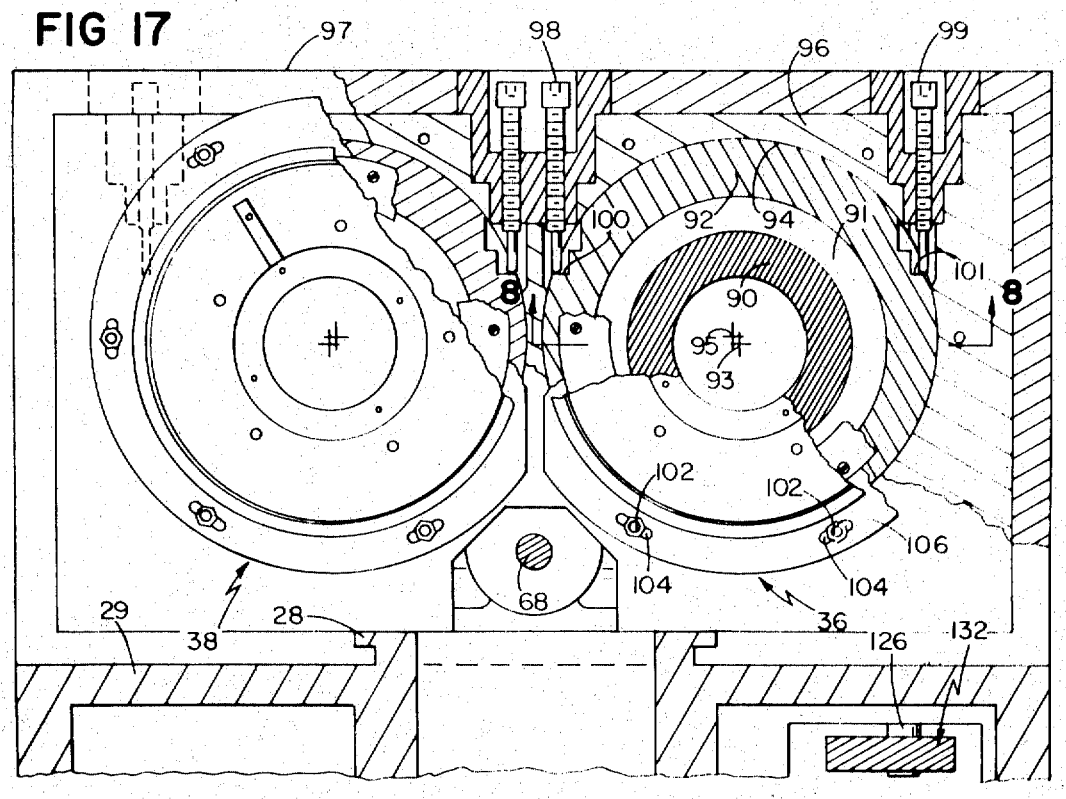
FIG. 17 is a sectional view along 17—17 of FIG. 3, partially broken away, with the cutter heads not shown.

Cutter 36 is mounted on spindle 90 (FIGS. 1, 8, 17) which is carried in eccentric sleeve 92 for rotation in bearing 91 about axis 93. Sleeve 92 is in turn mounted in cylindrical bore 94 of cartridge 96 fixed in housing 97 mounted on platform 29. Adjustment bolts 98 and 99 pass through housing 96 and bear against flats 100 and 101, respectively, on sleeve 92. Bolts 102 (only one shown in FIG. 8) pass through holes 104 in flange 106 of sleeve 92 to fix the sleeve in cartridge 96. Holes 104 are elongated to allow up to 3° of rotation of sleeve 92 in cartridge 96 about axis 95 of the housing, upon loosening of bolts 102 and adjustment of bolts 98 and 99, thereby to change the center distance between the axis of work spindle 25 and cutter axis 93 by up to 0.013" (with a corresponding maximum shift of the cutter axis in the direction parallel to the work spindle axis of only .0003").

Spindle 90 is driven by worm 82 through worm wheel 110.

Cutter 38 is mounted in the same way as cutter 36, and is driven in rotation by worm 84 through worm wheel 112 (FIGS. 1, 2).

Shaft 80 extends through bearing 86 and carries at one end rotary bearing 120 (FIGS. 1, 2). Pin 122 extends between the housings of bearings 120 and 86 to prevent their relative rotation, while allowing bearing 120 to move axially with shaft 80. Pin 126 (FIGS. 1, 3) is carried by reed block 128 mounted on the underside of bearing 120, and is journaled in the end of arm 130 of lever 132.

Figure 15:
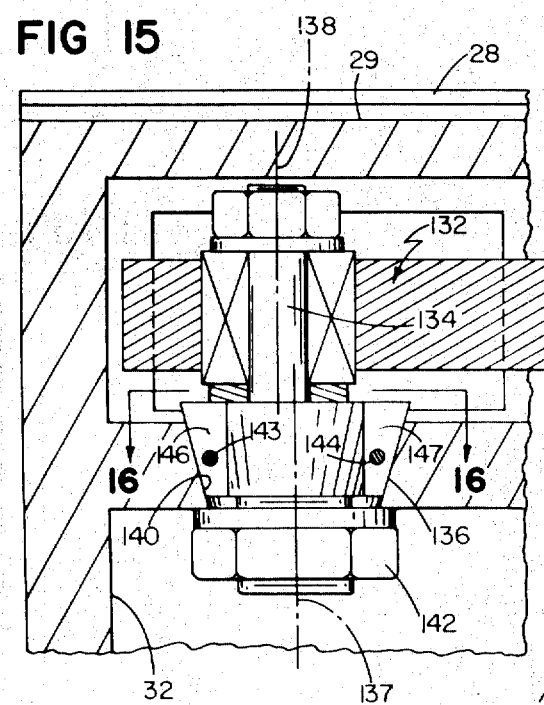
FIG. 15 is a sectional view along 15—15 of FIG. 2.
Figure 16:
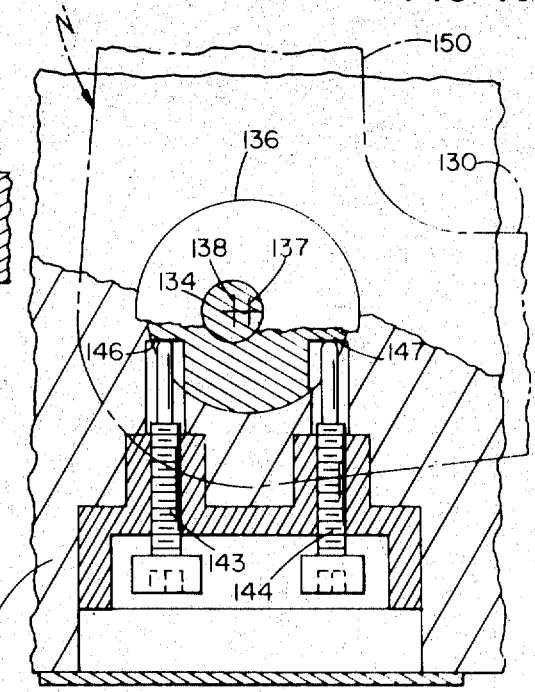
FIG. 16 is a sectional view along 16—16 of FIG. 15.

Lever 132 is pivoted on shaft 134 (FIGS. 1, 15, 16) which has a frusto-conical shank 136 the axis 137 of which is eccentric to axis 138 of shaft 134. Shank 136 is held tightly in hole 140 of base 32 by nut 142. Bolts 143 and 144 in base 32 bear against flats 146 and 147, respectively, on shank 136. Shank 136 can thus be rotated up to 3° by loosening nut 142 and adjusting bolts 143 and 144. The short lever arm 150 has a flat 152 (FIGS. 2-7) against which abuts (during the cutting portions of the machine cycle) the tip of inner screw 154 of phase control 155, to be described. The effect of rotation of shank 136 is to shift axis 138 (about which lever 132 pivots) along the direction of lever arm 150 by up to 0.016" (with a corresponding maximum shift of axis 138 along lever arm 130 of only 0.003"), thereby shifting flat 152 relative to screw 154 and hence changing the effective length of arm 150.

Phase control 155 (FIGS. 2-7) is carried in apron 33, and includes nut 158 (FIGS. 4, 5) axially fixed in rotary bearing 160 mounted in the apron, outer screw 162 threaded in nut 158, and inner screw 154 threaded inside screw 162 and having a manual adjustment knob 164. Screw 162 is splined to bearing 160 at 166, so that rotation of nut 158, under the control of cam follower arm 168 affixed thereto, will result in axial movement of the two screws as a unit.

Rod 170 (FIG. 2) of power cylinder 172 acts as a spring to hold flat 152 against screw 154 so that lever 132 will pivot as slide 26 moves on ways 28 (as described in detail below). Stop 174 limits the motion of the lever as the slide retracts.

Double acting power cylinder 180 (FIGS. 2, 3), fixed on base 32 with rod 181 fixed to slide 26, supplies the motive power for movement of the slide. Slide feed control 182 (FIGS. 2-5) determines the extent and speed of slide movement, and includes nut 184 mounted in rotary bearing 186 fixed in the apront, and screw 188 threaded in nut 184 and splined to bearing 186 at 190. Screw 188 abuts stop 189 (FIGS. 2, 3) on base 32 during the cutting portions of the machine cycle. Rotation of nut 184, to linearly advance and retract screw 188 is accomplished through gear 196 and gear 197, of slightly smaller diameter than gear 196, both carried by the nut.

To drive the nut, gear 198 (FIGS. 4, 5), of the same diameter as gear 197, is mounted on idler shaft 200 and meshes continuously with gear 197. Double sector gear 202 has one 180° sector 204 of diameter equal to that of gear 196, and a second 180° sector 206 of diameter equal to that of gear 197. The two sectors have the same number of teeth, overlap, and are mounted on shaft 210 driven in one direction by variable speed hydraulic motor 212. During each complete revolution of shaft 210, sector 204 drives gear 196 for one half revolution, rotating nut 184 in one direction, and sector 206 drives gear 197 through idler 198 for the other half revolution, rotating the nut in the opposite direction.

Cams 214 (FIGS. 4-6) and 216 (FIGS. 4, 5, 7) are mounted on shaft 210 and operate hydraulic valve 194 and cam follower arm 168, respectively, arm 168 bearing against the cam 216 with roller 220. Valve 194 is in the fluid supply line to motor 212, to control the motor speed and hence the speed of rotation of nut 184.

Cutter 36 has a body 220 (FIGS. 8-14) bolted in the head 222 of spindle 90. Matching oblique surfaces 223 and 224 of head 222 and body 220, respectively, align the head and body, and key 225 prevents their relative rotation. A carbide tool 226 is clamped in each of a series of ninety radial V-grooves 227 (FIG. 11) equally spaced around the periphery of body 220, the tools being held in place by clamping ring 228 bolted to body 220. Ring 228 has a circumferential slot 229 across which pass tightening bolts 230 (one for each pair of tools). The tools are firmly clamped in place by turning bolts 230 to force ring portion 232 downwardly. A hollow ring 234, packed with small spheres 236 of tungsten alloy (e.g., 0.002 inch in diameter) is bolted to clamp 228 to dampen cutter vibrations during operation of the machine.

Each tool 226 has a mounting portion 240 (see especially FIGS. 9, 10, 12-14) between a pair of cutting portions 242 and 244. Portion 240 has a pair of tool orienting flats 241 (FIG. 11) making an angle bisected by transverse tool axis 251, axis 251 being parallel to axis 93 when the tool is installed in the cutter (see FIG. 22). The flats respectively mate with the sides of groove 227. The tools are mounted in cutter 36 with cutting portions 242 protruding from head 220 (FIGS. 8, 9).

Each portion 242 has a leading face 246 tilted at a small clearance angle relative to an imaginary reference plane 248 (FIG. 22) which is at an angle to axis 93 of the cutter (and to tool axis 251) equal to the desired helix angle of gear 21 (taken at the base circle of the gear). The periphery of face 246 includes straight line cutting edge 252 in plane 248, cutting tip 254 having a radius of curvature matching that of fillet 24 of gear 21, a concave cutting edge 256 generally opposite edge 252, and a short concave cutting edge 258 forming a continuation of edge 252 and used to relieve the tips of gear teeth 22.

Edges 252 of all the tools in cutter 36 lie in a single plane perpendicular to axis 93. The side and tip surfaces 260, 262, and 264 of portion 242 all slope away from face 246 at small clearance angles to planes normal to reference plane 248, as indicated in part in FIG. 22.

Tool cutting portion 244 is, except for its orientation on the tool, a mirror image of portion 242, and has, e.g., a leading face 266 making a small clearance angle with reference plane 270, straight line cutting edge 268 in plane 270, cutting tip 271, tip surface 272. Faces 246 and 266 are on the same side of the tool, but differ in their orientation in that the corresponding reference planes 248 and 270 are respectively tilted to opposite sides of tool axis 251, each by an angle equal to the desired helix angle of gear 21 taken at the base circle.

Planes 248 and 270 are thus at twice the helix angle to each other.

Cutter 38 is identical to cutter 36, except that its tools 226 are mounted with portions 244 protuding from the cutter head (FIG. 10). Leading faces 246 and 266 all face blank 20 as they approach the blank from above when the cutters are rotating in the directions indicated in FIGS. 1 and 22.

Tools 226 are radially oriented in cutter 36 by ring 280 bolted to head 220, and by removable ring 281 (FIG. 9) having a vertical positioning surface 282. Ring 280 has a curved surface 283 (FIG. 9) which matches tool edge 284 of portion 244 (the curvature of edge 284 corresponding to edge 256 of portion 242). The tools will just fit between surfaces 282 and 283 if they are inserted with portions 244 adjacent ring 280. If an attempt is accidentally made to insert a tool (i.e., tool 226' shown in FIG. 9) with portion 242 against ring 280, the tool will not seat in the V-groove, since due to the difference in orientation of portions 242 and 244 relative to axis 291, edge 288 of surface 260 project beyond edge 256 and will interfere with surface 283. After the tools are clamped in place, ring 281 is removed.

Tools 226 are similarly radially oriented in cutter 38, except that surface 290 (FIG. 10) of ring 292 matches the combination of tool edges 252 and 258, rather than edge 256.

The spacing of tools 226 about each cutter is chosen to make the circumferential distance between adjacent edges 252 or 268, along a theoretical cutter pitch circle, equal to the cotangent of the helix angle of gear 21 multiplied by the circular pitch of gear 21, both quantities being taken at the base circle of the gear. The radius of the theoretical cutter pitch circle is equal to the difference between the center distance spacing of the respective axes of rotation of cutter 36 (or 38) and spindle 25, and the base circle radius of gear 21. Since the radius of the cutter pitch circle is also dependent upon the circumferential spacing between tool edges 252 along that circle (for a given number of tools in the cutter), it follows that the center distance between cutter and gear blank axes determines the helix angle of gear 21 for a given base circle.

The ration of the effective lever arm lengths of arms 130 and 150 of lever 132 determines the base circle of gear 21, and is equal to EF/GH, where E is the number of tools 226 in each cutter, F is the desired base circle diameter of gear 21, G is the desired number of teeth 22 in gear 21, and H is the common pitch diameter of worm wheels 110 and 112.

The eccentric mountings of the cutter spindles and of lever 132 respectively provide for fine adjustment of the helix angle and base circle radius of gear 21.

The ratio of the common rate of rotation of cutters 36 and 38 (taken when slide 26 is stationary) to the rate of rotation of spindle 25 is equal to the ratio of the desired number of teeth 22 to the number of tools 226 per cutter.

Work spindle adapter 48 (FIGS. 1, 3, 18, 20) of automatic loading assembly 42 has an expansive arbor 300 with actuating pin 301, and elastomeric O-ring 302, and is mounted for rotation in one end of spider 50. Adapter 46 is identically structured and mounted at the opposite end of spider 50. Reversible motors 304 and 306 are provided to rotate or brake the adapters as described below.

Power cylinder operated rod 310 is mounted for axial movement against pin 301 (FIG. 20) in bore 311 of spindle 25.

Figure 19:
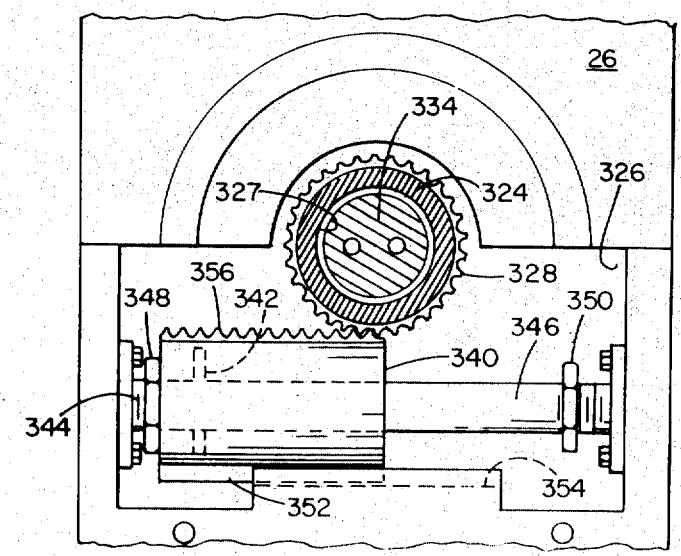
FIG. 19 is a fragmentary plan view partially cut away of a portion of the mechanism of FIG. 18.
Figure 20:
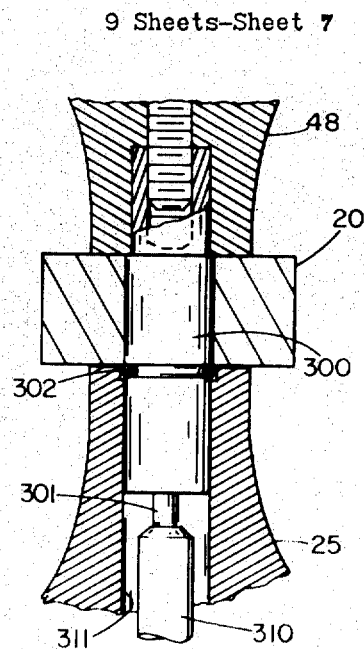
FIG. 20 is an enlargement of a portion of FIG. 18, with additional sectioning.
Figure 18:
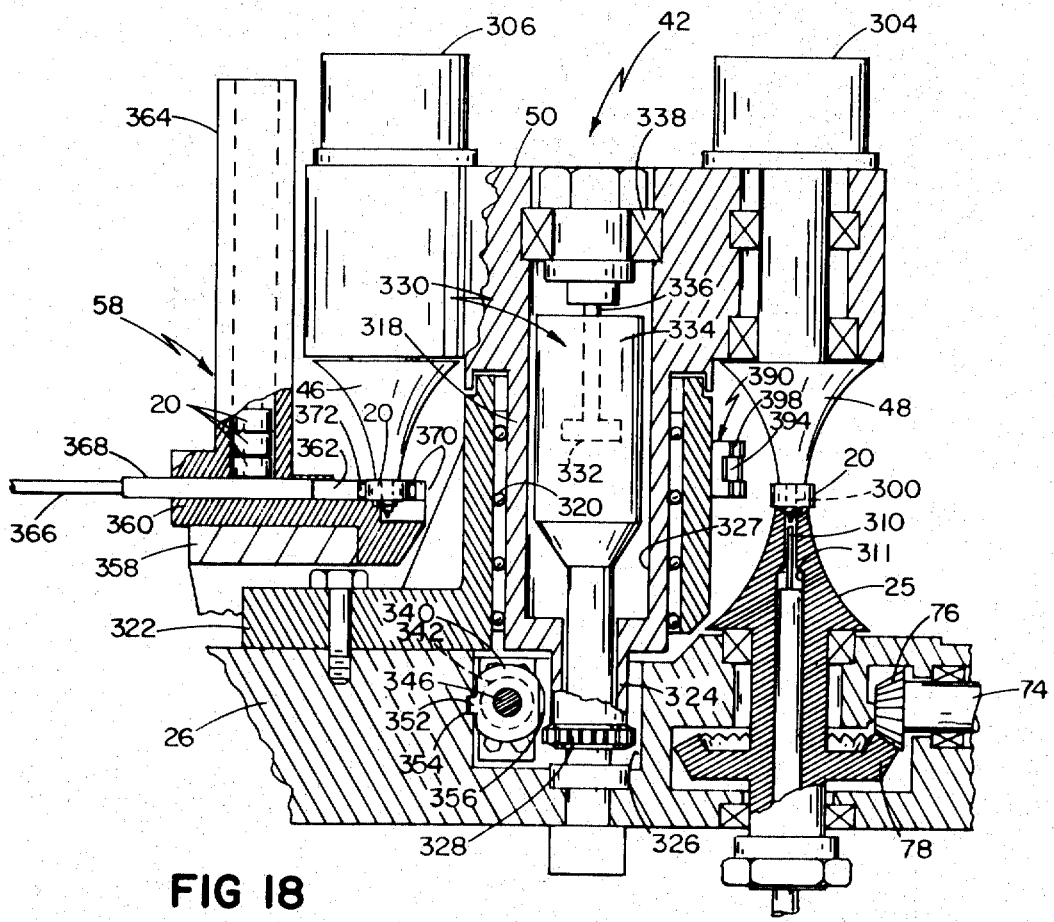
FIG. 18 is a partially sectional elevation of the automatic loading mechanism.

Cylindrical extension 318 (FIG. 18) of spider 50 extends through bearing 320 provided in bracket 322 bolted to slide 26. Reduced diameter portion 324 of extension 318 extends into recess 326 of slide 26 and carries a spur gear 328 (FIGS. 18, 19). Power cylinder assembly 330 is inside bore 327 in spider extension 318. Piston 332 in double acting cylinder 334, fixed at its bottom in recess 326, has its rod 336 axially fixed relative to spider 50 by bearing 338 mounted in bore 327, so that actuation of the cylinder will raise or lower spider 50 relative to slide 26. A pair of pilot holes 337 are provided on opposite sides of bracket 322 (only one shown in FIG. 1), and cooperate with pin 339 to rotationally lock spider 50 in its lowered position.

Power cylinder 340 (FIGS. 18, 19) has its piston 342 axially fixed between rods 344 and 346 mounted in recess 326. Cylinder 340 is thus free to move axially between adjustable stops 348 and 350, and has a ridge 352 that runs in groove 354 in slide 26. Rack 356 is ground into the exterior of cylinder 340, and meshes with gear 328, when spider 50 is in its raised position, to rotate the spider and reverse the positions of adapters 46 and 48.

Gear blank supply station 58 (FIGS. 1, 3, 18, 25) is mounted on bridge 358 fixed to frame 32 and includes a trough 360 providing a rectangular channel 362 supplied from a stack of blanks 20 in tube 364. Cylinder operated pushrod 366 controls a pushing block 368 which fills the cross-section of channel 362 and reciprocates therealong to advance blanks as needed to the open forward end of the channel. Trough 360 is open at 370 at its forward end to expose a single blank there for loading on one of the spindle adapters. Locating block 372 (FIG. 25) is mounted in housing 374 adjacent opening 370, and extends into the channel. Front surface 376 is contoured to match the exterior surface of gear blank, and is relieved at 378 so that block 368 can push a blank 20 into position adjacent surface 376. Spring 380 biases block 372 against a blank 20 in position to be loaded.

Pick-off 390 (FIGS. 3, 18) is mounted on bracket 322 and has a channel 392 the mouth 394 of which is level with a blank 20 carried on adapter 46 or 48 when spider 50 is in its raised position. The channel slopes downwardly from mouth 394 so that its top wall 396 will act as a cam to remove a completed gear from the adapter as it passes by upon rotation of spider 50. Wall 396 has a slot 398 for passage of arbor 300.

Suitable control circuitry is provided to properly sequence the various operations of the machine.

The operation of the machine is in part dependent upon the shapes of cams 214 and 216, which can, of course, be changed. Operation with circular cams (or, as is equivalent, with follower arm 168 removed and motor 212 running at constant speed) will be described first.

Operation will be considered from the time when spindle 25 and cutters 36 and 38 are in rotation at constant speed under power of motor 60, and cylinder 180 is expanded to hold slide 26 in its fully retracted position (FIG. 2) with screws 154 and 188 separated from flat 152 and stop 189, respectively. Cylinder 172 holds lever arm 150 against stop 174. Spider 50 is in its lowered position with the arbor of adapter 46 inserted in the bore of a blank in trough 360 (FIG. 18). Gear 328 is out of mesh with rack 356, with cylinder 340 against stop 348. Arbor 300 of adapter 48, carrying a blank 20, is in bore 311 of spindle 25. Rod 310 is pressed against pin 301 (FIG. 20) so that arbor 300 is expanded into tight, driving engagement with the blank and with the inner surface of bore 311. Motors 304 and 306 are turned off. Motor 212 is operating, and sector 204 of gear 202 is about to engage gear 196 to begin retraction of screw 188.

Further operation is initiated by reversing cylinder 180 to rapidly advance slide 26 until screw 188 hits stop 189, at which position screw 154 will be in contact with flat 152. With the slide in this position, blank 20 on arbor 300 is adjacent the paths of tools 226 of cutters 36 and 38, and the next blank carried by adapter 46 is out of trough 360 and held on its corresponding arbor by the O-ring. Rod 366 is actuated to move another blank into loading position adjacent block 372.

Further forward motion of the slide is made possible only by the continued retraction of screw 188, which occurs at a constant rate. As the slide moves forward, cutters 36 and 38 will simultaneously generate tooth profiles on the correspondingly opposite sides of teeth 22. Considering the action of cutter 36 as typical, one tool 226 will sweep across the face width of the gear blank adjacent one tooth position, the next tool will make a corresponding cut adjacent the very next tooth position, and so on, so that a corresponding cut will be made on the corresponding side of each tooth before a second cut is made on the same side of the first tooth. Because of the circular motion of the tools, the early cuts will not extend across the full face width of blank 20 (FIG. 23). However, the advance of slide 26 will cause successive cuts on each tooth to be deeper and deeper, so that before long the cuts will extend across the full face width (FIG. 24). Lever 132 is caused to pivot by screw 154 pressing against flat 152, and in turn moves shaft 80, and hence worm 82, axially through a distance proportional to the advance of slide 26, so that a differential rotation is added to the basic rotation of cutter 36, the latter being produced by the rotation of worm 82. Rotation of lever 132 is facilitated by reed block 128. The linear advance of blank 20 and the differential rotation of cutter 36 together constitute an effective rolling motion of the blank relative to the cutter and cause the successively deeper cuts by tool edges 252 on any given tooth to be tangent to the desired involute tooth profile 23 at lines successively approaching the desired root circle of gear 21. Selected positions in the sequence of successive tool positions are shown in FIG. 26 for a pair of facing profiles 23, one generated by the tools cutter 36, the other by the tools of cutter 38. The heavy dashed lines show the loci of positions of a single point on the tools of each cutter. Considering the action of cutter 36 as typical, the involute portions of the tooth profiles are fully generated by tool edges 252. Tool tips 254 form (rather than generate) the tooth fillets on the final, deepest cuts on the respective teeth. The fillet shape can therefore be chosen for optimum strength, and can either be undercut or not as desired. Tool edges 256 rough out material in the paths of the tools of cutter 38 (just as the tools of cutter 38 rough out material in the paths of the tools of cutter 36), once slide 26 has advanced sufficiently so that the tool paths of the respective cutters overlap. Tool edges 258 form tooth tip relief during the last few cuts on each tooth.

Cutter 38 operates the same way as cutter 36. The differential rotation proportional to the axial movement of shaft 80 is subtracted from the basic rate of rotation of cutter 38 (by virtue of the opposite handedness of worms 82 and 84), as is necesary because the two cutters generate the correspondingly opposite profiles of teeth 22.

The number of tools in cutter 36 is chosen to be prime to the number of teeth 22, so that a different tool will make each successive cut adjacent a given profile, thereby averaging any ripple errors.

Blank 20 will have been cut to the desired depth by the time sector 204 of gear 202 disengages from gear 196, and sector 206 engages idler 198, to reverse the direction of rotation of screw 188, and hence cause slide 26 to retract (against the continued force of cylinder 180). On the reverse movement of the workpiece the cutters will smooth out any irregularities in the tooth profiles caused on the initial cutting cycle, e.g., by mechanical deflection due to the cutting forces. As soon as the workpiece is out of the path of the cutters, cylinder 180 is reversed to rapidly retract the slide to its outermost position. During the rapid retraction, rod 310 is drawn away from pin 301, so that arbor 300 will contract; and cylinder 334 is reversed to raise spider 50, lifting arbor 300 (carrying the completed gear) from spindle 25, and bringing gear 328 into mesh with rack 356. Cylinder 340 is now reversed to move itself against stop 350, rotating spider 50 by 180° to bring the new blank carried by adapter 46 into position for being worked in the next cutting cycle, just as described above. As the spider rotates, the completed gear on arbor 300 enters mouth 394 (FIG. 3) of pick-off 390 and is stripped from the arbor. When slide 26 reaches its outermost position cylinder 340 is reversed to lower spider 50, dropping arbor 300 into a new blank in trough 360, and coupling adapter 46 and spindle 25. As soon as the new blank is seated on spindle 25, rod 310 is raised to expand the arbor of adapter 46. Cylinder 300 is again reversed to move itself against stop 348 for meshing with gear 328 on the next cycle.

Tooth thickness for gear 10 is determined by the phase angle between the tools of cutter 36 and those of cutter 38. That phase angle can be adjusted by turning knob 164, thereby axially shifting screw 154 in screw 162 and changing the distance between the plane of cutting edges 252 and 268 and the gear blank for a given position of lever 132 (the phase angle change resulting from the fact that the cutters turn in opposite directions). Therefore, during the rapid advance of slide 26, screw 154 may hit flat 152 before screw 188 hits stop 189.

If desired, the phase angle can be changed slightly after the workpiece has been initially cut to depth, so that on the reverse cutting cycle the tools will remove a small amount of additional stock from the workpiece, further improving the finish. This can be accomplished, e.g., by rotation of nut 158, to advance or retract screws 154 and 162 as a unit. To this end, cam 216 can have one 180° sector 216b (FIG. 27) of its surface of radius slightly larger than that of its other 180° section 216a, and arranged so that roller 218 will shift from sector 216a to sector 216b when the workpiece has been initially cut to depth. Thus, although tool edges 252 and 268 generate profiles on the forward cutting cycle, additional, and final, profiles may be generated on the reverse cutting cycle, through operation of phase control 155.

So long as roller 218 follows a constant-radius sector of cam 216 on the reverse cutting cycle, the final tooth profiles 23 will be of involute form. However, noninvolute profiles can be generated by causing roller 218 to follow a cam sector 216c (FIG. 28) the radius of which varies during the cutting cycle in which the final profile is determined. The variation in cam radius produces a cutter phase angle change during the profile generating cycle, so that edges 252 and 268 will make cuts to one side or the other of the involute profile that would otherwise be generated. This type of phase angle change can also be used, instead of cutting edges 258, to relieve the tips of the teeth.

Alternatively, as shown in FIG. 7, cam 216 can be shaped to cause generation of an involute profile during the reverse cutting cycle, and to cause continuous adjustment of phase control 155 during the forward cutting cycle. Corresponding selected positions in the sequences of successive tool positions for cutters 36 and 38 during the forward cutting cycle are shown in FIG. 29, the tool outlines for cutter 38 being shown in solid lines, and those for cutter 36 in broken lines. Cam sector 216d corresponds to the forward cutting cycle (after the rapid advance of slide 26), and has a slope from an initial radius $R_1$ to a final radius $R_2$, the latter corresponding to a maximum depth cut tangent to the desired final profile. As a result, on the forward cutting cycle, the tools are shifted laterally from the desired tooth profiles across the center line of the tooth space so that edges 256 and 254 of the tools of cutter 36 will remove, on each cut, any metal in the path of edge 268 of the next tool of cutter 38 to enter the tool space. The tools of cutter 38 will similarly prepare the way for edges 252 of the tools of cutter 36, so that on the forward cutting cycle edges 252 and 268 will do no cutting. For the reverse, profile generating cycle, cam sector 216e is of constant radius $R_2$, so that edges 252 and 268 will make cuts tangent to the desired involute profiles, as discussed earlier in connection with FIG. 26. The remaining cam sector 216f rapidly slopes back to radius $R_1$, and corresponds to the rapid retraction and advance of slide 26 when the cutters are not in contact with the workpiece. One advantage of this arrangement is that the load on the profile generating cutting edges is reduced, since most of the metal is removed by other portions of the tool, thereby increasing tool life between sharpenings.

Cam 216, shaped as shown in FIG. 7, is advantageously used with a non-circular cam 214, shaped as shown in FIG. 6, and with tools 226 ground with their cutting edges slightly rounded rather than knife-edge sharp. Because of their rounded edges the tools will not remove stock unless slide 26 is advanced (or, on the reverse cycle, retracted) between successive cuts by a distance at least as great as the radius given the particular tool edge doing the cutting. On the other hand, for finishing the profiles smoothly, it is desireable that successive cuts be very close together. Both these considerations can be accommodated with the cutting pattern of FIG. 29, by rounding finishing edges 252 and 268 with a small radius of, e.g., 0.0005", and rounding the remaining edges with a larger radius of, e.g., 0.003", and by providing cam 214 with a sector 214a for the forward cutting cycle having an increasing radius. Sector 214a causes valve 194 to progressively slow motor 212 as the slide advances, while always providing for a slide advance between successive cuts in a tooth space that is larger than the radius of the tool roughing edges. The deceleration of the slide equalizes the thickness of the chips taken out of the workpiece by the tips of the tools, hence making more uniform the load on the tools to further improve tool life. On the reverse, profile generating cycle, cam sector 214b of decreasing radius again controls chip thickness as desired, more closely spaced cuts being made possible by the sharper edges 252 and 268. Cam sector 214c is of constant radius, corresponding to rapid retraction and advance of the slide.

In FIG. 30 there is shown another preferred embodiment identical to that of FIG. 1 except that the V-grooves of both cutters are at angles to the cutter axes so that edges 252 and 268 respectively lie along elements of wide-angle convave cones (e.g., 177°–179° included angle.) In operation this embodiment will produce crowned gear teeth having involute form to within normally acceptable dimensional tolerances, and can also, of course, be used to produce crowned teeth of non-involute form.

Certain subject matter disclosed above was the invention of Paul Maker, in accordance with the United States patent application signed by him July 22, 1969.

Other embodiments will occur to those skilled in the art and are within the following claims.

What is claimed is:

1. In gear making apparatus having a workpiece support adjacent a cutter, workpiece loading and unloading apparatus, comprising:
   a workpiece supply station,
   a carrier,
   means for oscillating said carrier with respect to said station and said support, said means including means for causing said carrier to rotate about and move along an axis and to translate with respect to said supply station along a direction generally transverse to said axis, and
   a pair of workpiece holders mounted on said carrier at positions spaced from said axis.

2. The loading and unloading apparatus of claim 1 wherein said carrier and said support are mounted on a common slide.

3. The loading and unloading apparatus of claim 2 wherein said slide is movable from a first position in which one said holder is adjacent said supply station to pick up a workpiece; through a second position in which said one holder, carrying said workpiece, is spaced from said station and said support, and the other said holder, carrying another workpiece, is spaced from said cutter; to a third position spaced from said second position in the direction of said cutter sufficiently to enable removal of stock from said other workpiece by said cutter.

4. The loading and unloading apparatus of claim 2 wherein means including said support and one of said holders are provided to hold a workpiece between said support and said one holder during movement of said slide from a first position to a position sufficiently spaced from said first position in the direction of said cutter to enable removal of stock from said workpiece.

5. The loading and unloading apparatus of claim 4 wherein said one holder includes an expansive arbor, and an actuator is mounted to expand said arbor into tight engagement with the wall of a bore in said support and with said workpiece during said movement of said slide from said first position, whereby said arbor, other workpiece, and support can be rotated as a unit.

6. The loading and unloading apparatus of claim 1 wherein said carrier has a first position with one of said holders coupled to said support with a workpiece therebetween, and a second position spaced along said axis from said first position, said one holder being uncoupled from said support in said second position to allow said rotation, upon 180° of which said holders reverse their positions.

7. The loading and unloading apparatus of claim 6 further comprising means including a pick-off providing a cam surface arranged to wipe said workpiece off said one holder upon said rotation of said carrier.

8. The loading and unloading apparatus of claim 1 wherein said support rotates during the machine cutting cycle, and means are provided to alternately rotate each said holder to match the speed of said support.

9. The loading and unloading apparatus of claim 1 further comprising a power cylinder for moving said carrier axially, and a rack and pinion for rotating said carrier, said rack and pinion being in mesh in only one axial position of said carrier.

10. The loading and unloading apparatus of claim 1 wherein:
   said carrier includes a power cylinder operated cylindrical extension to enable said movement along said axis;
   a rack is mounted to mesh, in one axial position of said carrier, with a pinion carried by said extension to enable said rotation;
   means are provided to respectively alternately rotatively accelerate said holders, a holder upon said acceleration matching rotation of said support;
   each said holder has an expansive arbor to facilitate tight driving coupling of the holder, a workpiece, and said support, said support having a bore to receive said arbor, an actuator being mounted to expand said arbor upon its insertion into said bore;
   said carrier and said support are mounted on a single slide for translation relative to said supply station; and
   said supply station is fixed.

References Cited
UNITED STATES PATENTS

| | | | |
|---|---|---|---|
| 953,752 | 4/1910 | Neureuther | 90—9 |
| 2,463,165 | 3/1949 | Felin et al. | 90—1 |
| 3,520,227 | 7/1970 | Hunkeler et al. | 90—1 |

FOREIGN PATENTS

| | | | |
|---|---|---|---|
| 1,138,607 | 10/1962 | Germany | 90—4 |
| 979,784 | 1/1965 | Great Britain | 90—4 |

GIL WEIDENFELD, Primary Examiner

U.S. Cl. X.R.

90—3